United States Patent [19]

Petruccello

[11] Patent Number: 5,220,832

[45] Date of Patent: Jun. 22, 1993

[54] OPPOSITELY TOOTHED CORE ADJUST HAVING INTEGRAL INNER MEMBER AND CONTROL ATTACHMENT

[75] Inventor: John Petruccello, Detroit, Mich.

[73] Assignee: Teleflex, Incorporated, Limerick, Pa.

[21] Appl. No.: 759,495

[22] Filed: Sep. 13, 1991

[51] Int. Cl.⁵ .............................................. F16C 1/10
[52] U.S. Cl. ................... 74/502.4; 74/500.5;
74/501.5 R; 74/502.6; 403/104; 403/379
[58] Field of Search ............ 74/501.5 R, 500.5, 501.6,
74/502, 502.4, 502.6, 503; 192/111 A; 403/104,
379

[56] References Cited

U.S. PATENT DOCUMENTS

| | | | |
|---|---|---|---|
| 3,665,784 | 5/1972 | Bennett | 74/501 |
| 4,177,691 | 12/1979 | Fillmore | 74/501 P |
| 4,304,322 | 12/1981 | Beccaris | 192/11 A |
| 4,658,668 | 4/1987 | Stocker | 74/501.5 R |
| 4,688,445 | 8/1987 | Spease et al. | 74/501 R |
| 4,693,137 | 9/1987 | Deligny | 192/111 A |
| 4,694,706 | 9/1987 | Lichtenberg et al. | 74/501.5 R |
| 4,751,851 | 6/1988 | Deligny et al. | 74/501.5 R |
| 4,787,263 | 11/1988 | Jaksic | 74/502.5 X |
| 4,829,845 | 5/1989 | Suzuki | 74/502.4 |
| 4,841,805 | 6/1989 | Italiano | 74/502 |
| 4,869,123 | 9/1989 | Stocker | 74/501.5 R |
| 4,887,930 | 12/1989 | Chaczyk et al. | 403/379 |
| 4,932,503 | 6/1990 | Yamamoto | 74/501.5 R |
| 4,936,161 | 6/1990 | Polando | 74/501.5 R |
| 4,987,968 | 1/1991 | Martus et al. | 74/502.4 X |
| 5,163,338 | 11/1992 | Sharp et al. | 403/379 X |

*Primary Examiner*—Vinh T. Luong
*Attorney, Agent, or Firm*—Reising, Ethington, Barnard, Perry & Milton

[57] ABSTRACT

A motion transmitting remote control assembly (10) which includes a conduit (12) and a motion transmitting core element (14) moveable longitudinally within the conduit (12) to transmit motion. A slider member is slidably disposed in an adjustment body (26). The slider member (70) moves inward into the adjustment body (26) transversely to a central axis (16) of the core element (14) to a locked position and moves outward transversely to the central axis (16) to an unlocked position to permit relative axial movement between the adjustment body (26) and slider member (70). A terminal receptacle (98) is disposed on the slider member (70) which accepts a control member into coupling attachment transverse to the central axis (16). The control member remains attached to the slider member (70) while the slider member (70) moves to the unlocked position to permit relative movement between the control member and the adjustment body (26).

20 Claims, 5 Drawing Sheets

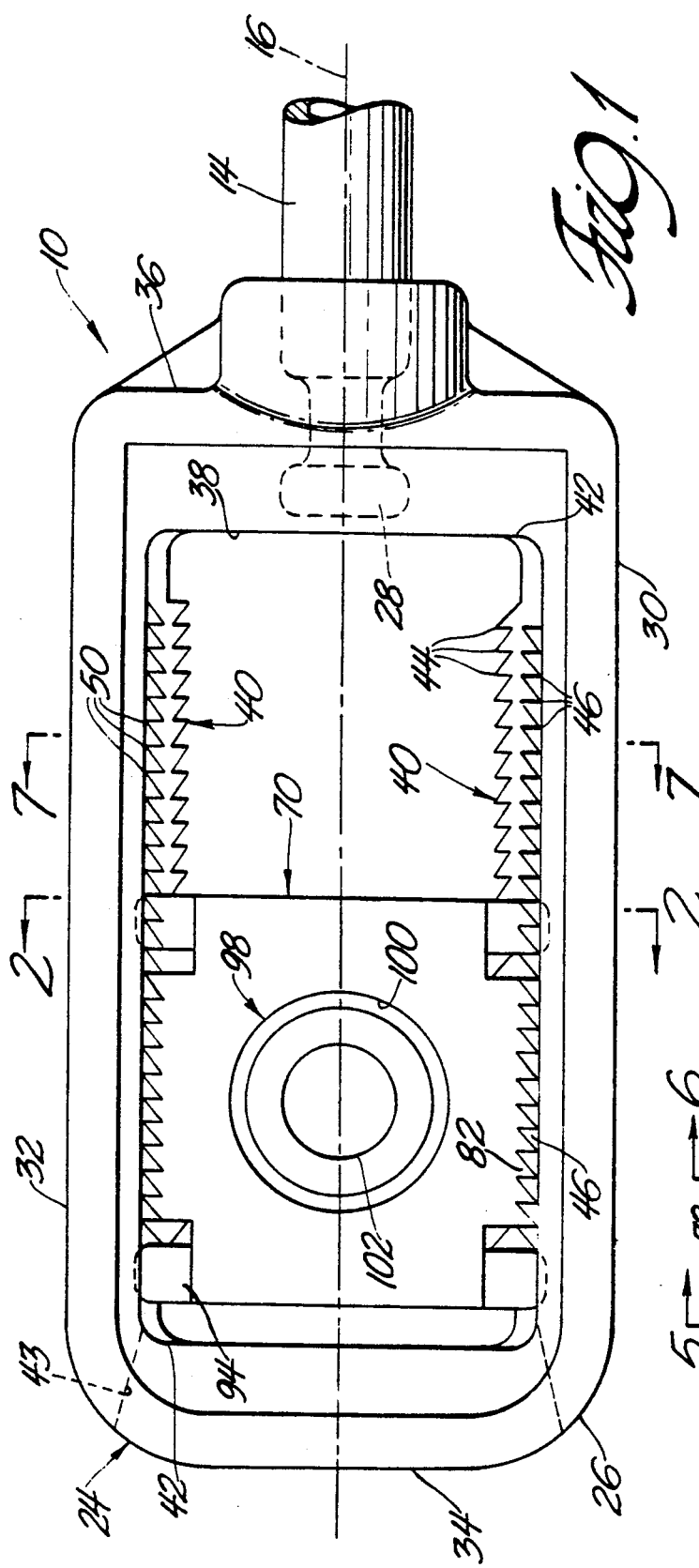

OPPOSITELY TOOTHED CORE ADJUST HAVING INTEGRAL INNER MEMBER AND CONTROL ATTACHMENT

TECHNICAL FIELD

The subject invention relates to a motion transmitting remote control assembly of the type for transmitting motion along a curved path by a flexible motion transmitting core element movably supported by a flexible conduit, and more particularly to an improved terminal adjust.

BACKGROUND OF THE INVENTION

Motion transmitting remote control assemblies for transmitting motion in a curved path are used in aircraft, automotive, and marine environments. Typical of the use of such remote control assemblies is the positioning of heater and vent control members in automobiles.

In such applications, it is frequently desirable to adjust the length or position of the end of the core element once the assembly has been installed. Such assemblies normally include one or more fittings secured to the conduit for attaching the conduit to a support structure of the automobile, and the core element is adapted at one end to be attached to a member to be controlled whereas the other end is attached to a manually graspable knob for longitudinally moving the core element. After the assembly has been installed, the position of the knob must be adjusted to correspond with the position of the member to be controlled so that both the knob and member to be controlled reach their terminal end stroke positions at exactly the same time. This is accomplished by either adjusting, manually or automatically, the length of the core element or the length of the conduit, as is well known in the art.

An example of a prior art adjustment assembly is shown in U.S. Pat. No. 3,665,784 to Bennett issued May 30, 1972 and assigned to the assignee of the subject invention. This patent discloses an adjustment means attached to the core element for adjusting the effective length of the core element in response to a predetermined force. This assembly, however, does not allow the adjustment means to be manually locked into position after adjusting the overall length of the core element to a desired length and then unlocked to readjust the length of the core element.

U.S. Pat. No. 4,869,123 to Stocker, issued Sept. 26, 1989 discloses a cable length adjuster including a housing, slider and a latch moveable normal to the direction of slider movement from an unlocked position to a locked position as the assembly is connected to a control member. This assembly, however, has the disadvantage that the control member must be disconnected prior to readjustment of the cable length.

In addition, U.S. patent application, Ser. No. 619,001, filed Nov. 28, 1990, discloses a cable length adjuster comprised of three members. The third member interconnects the first and second members and is moveable between an unlocked position and a locked position. Two rows of oppositely inclined teeth on a third member are moveable into engagement with two rows of oppositely inclined teeth on a first member to effect locking. The second member receives a control member and thereby couples the control member to the core element. However, by requiring three members the cost of production is increased. Additionally, the assembly has the disadvantage that the specific configuration of the second member does not allow the control element to be received transversely to the core axis which in some applications is required because of space restrictions.

SUMMARY OF THE INVENTION AND ADVANTAGES

The present invention provides a motion transmitting remote control assembly which includes a conduit and a motion transmitting core element moveable longitudinally within the conduit to transmit motion. An adjustment body and slider member is provided for adjusting the length of the core element. The adjustment body is secured to the core element and includes pluralities of incrementally spaced receiving teeth. The slider member has a plurality of engaging teeth spaced to coact with the receiving teeth. To prevent relative axial movement between the adjustment body and the slider member, the slider member moves inward transversely to the central axis of the core element to a locked position where the engaging and receiving teeth are engaged. The slider member moves outward transversely to the central axis to an unlocked position disengaging the engaging and receiving teeth to permit relative axial movement between the adjustment body and slider member. A terminal receptacle means is disposed on the slider member which accepts a control member into coupling attachment transverse to the central axis. The control member remains attached to the slider member while the slider member moves to the unlocked position to permit relative movement between the control member and the adjustment body.

This assembly has the advantage that it allows the slider member to be manually locked into position in the adjustment body after adjusting the overall length of the core element to a desired length and then unlocked to readjust the length of the core element without the disconnecting of the control member. Additionally, the slider member receives the control element transversely to the central axis which is required in some applications due to the placement of the units being controlled relative to the adjustment assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a bottom view of the preferred embodiment of the instant invention in the unlocked position with the slider member disposed in a fully extended position;

FIG. 4 is a top view of the slider member;

FIG. 5 is an end view of the slider member taken substantially along line 5—5 of FIG. 4;

DETAILED DESCRIPTION OF THE PREFERRED EMBODIMENT

Figure 2:
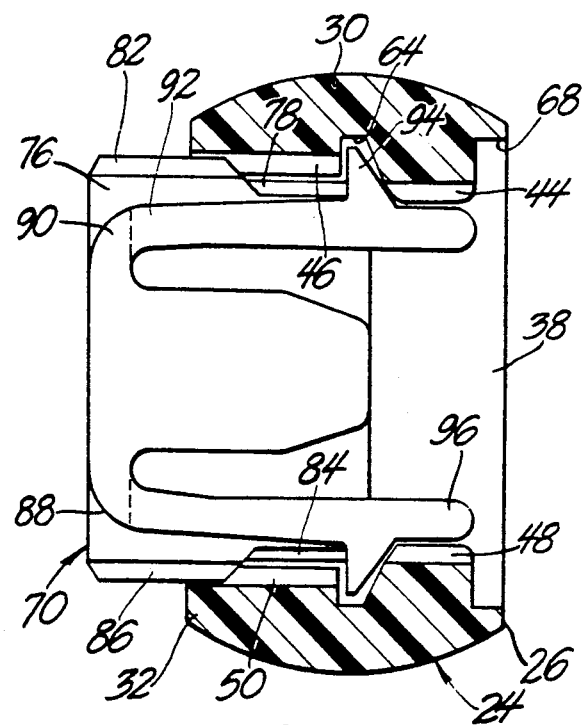
FIG. 2 is a cross-sectional view taken substantially along line 2—2 in FIG. 1.

Referring now to FIGS. 1-8, the preferred embodiment of a motion transmitting remote control assembly constructed in accordance with the instant invention is generally shown at 10. The assembly 10 includes a conduit 12 and a motion transmitting core element 14 which is moveably supported by the conduit 12. The core element 14 has a length and a central axis 16. Also, a fitting 18 is secured to the conduit 12 and is adapted for attachment to a support structure (not shown) by a flange 20 having a hole 22 disposed therein. Normally the fitting 18 will be disposed at each end of the conduit 12. The conduit 12 is preferably of the known type utilized in remote control assemblies including an inner tubular member over an organic polymeric material surrounded by a plurality of filaments or long lay wires disposed on a long lead and encased in an outer jacket of organic polymeric material. The organic polymeric materials may be of the various known plastics such as polyethylene, etc. Additionally, the fitting 18 is preferably fabricated from organic polymeric material and disposed about the conduit 12.

The assembly 10 includes an adjustment means, generally indicated at 24, for adjusting the relative lengths between the core element 14 and the conduit 12. That is, the adjustment means 24 is provided for adjusting the length of the core element 14 so as to effect a positional calibration between the controlling and controlled members at each end of the core element 14. In the embodiment of FIGS. 1-8, the adjustment means 24 accomplishes this effective length adjustment by allowing the length of the core element 14, i.e., the distance between attachment points at each end of the core element 14, to be shortened or elongated depending on the need. According to the subject invention, the adjustment means 24 is of the manual type. Hence, the adjustment means 24 is maintained in an unlocked condition, moved to a correctly adjusted position, then manually locked into the adjusted position.

Figure 10:
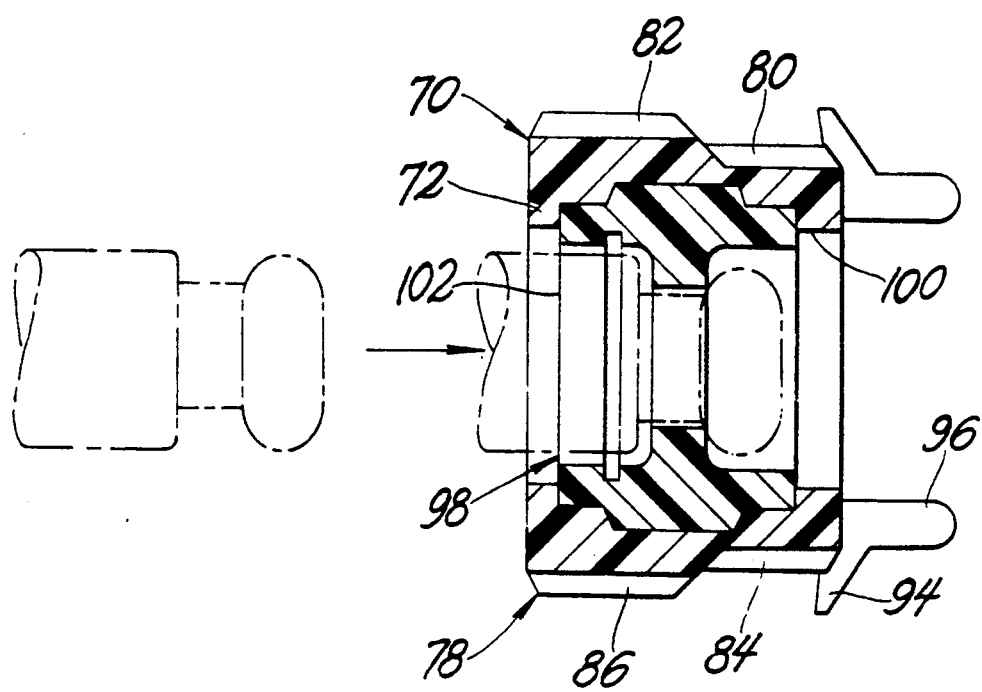
FIG. 10 is a cross-sectional view of the slider member as in FIG. 6 showing a control member in phantom.

The adjustment means 24 is attached to the core element 14 for adjusting the position of attachment to a control member as shown in FIG. 10 longitudinally of the central axis 16 of the core element 14. The adjustment means 24 includes an adjustment body 26 molded about the core end 28 of the core element 14. The adjustment body 26 is generally rectangular in shape and includes a first 30 and second 32 lateral walls spaced parallel from one another. Each of the lateral walls 30,32 include an interior surface 42 presented toward the opposing wall 30,32 respectively. The adjustment body 26 also includes a front end 34 and a back end 36 spaced parallel to one another and rigidly interconnecting the walls 30,32 to form an open, rectangular framelike body 26. An elongated slot 38 is formed by the interior enclosure of the walls 30,32 and ends 34,36. Hence, the interior surfaces 42 of the first 30 and second 32 lateral walls face the slot 38. The first 30 and second 32 lateral walls extend parallel to the central axis 16 and the ends 34,36 extend perpendicular to the core axis 16, with the core end 28 embedded within the back end 36. An opening 43 extends through the front end 34.

The adjustment body 26 includes a plurality of incrementally spaced receiving teeth, generally indicated at 40 in FIGS. 1 and 7-9, disposed on opposite sides of the slot 38 on each of the interior surfaces 42 of the first 30 and second 32 lateral walls. The receiving teeth 40 disposed on the first lateral wall 30 are arranged in a first upper receiving row 44 extending longitudinally of the central axis 16 and a first lower receiving row 46 extending longitudinally of the central axis 16. Likewise, the receiving teeth 40 disposed on the second lateral wall 32 are similarly arranged in a second upper receiving row 48 extending longitudinally of the central axis 16 and a second lower receiving row 50 extending longitudinally of the central axis 16. The first upper 44 and second upper 48 receiving rows are disposed in opposing relationship to one another, that is opposite each other across the slot 38. The first lower 46 and second lower 50 receiving rows are disposed in opposing relationship to one another, that is opposite each other across the slot 38.

Figure 7:
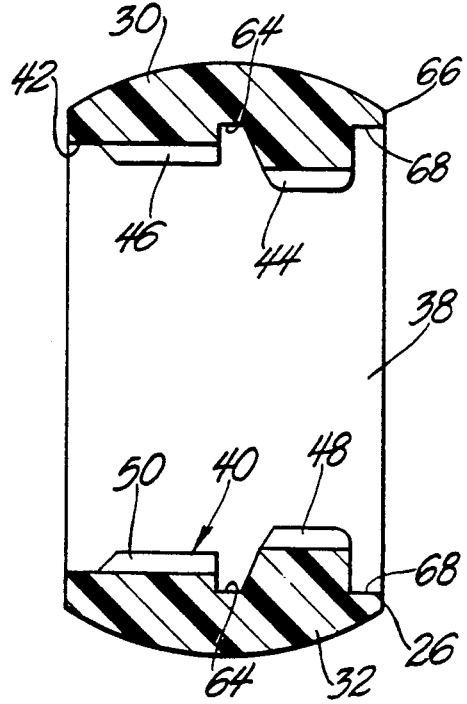
FIG. 7 is a cross-sectional view taken substantially along line 7—7 of FIG. 1 with the slider member removed.

The first upper receiving rows 44,48 extend further into the slot 38 than the lower receiving rows 46,50, thus providing an internally stepped, or offset, appearance as shown in FIGS. 1 and 7. The first 44 and second 48 upper receiving rows are therefore laterally offset relative to the central axis 16, from the first 46 and second 50 lower receiving rows. Hence, the distance between the upper receiving rows 44,48, measured across the slot 38, is less than the distance between the lower receiving rows 46,50. The laterally offset arrangement of the upper 44,48 and lower 46,50 receiving rows facilitates assembly of the subject adjustment means 24, as will be described subsequently.

Figure 8:
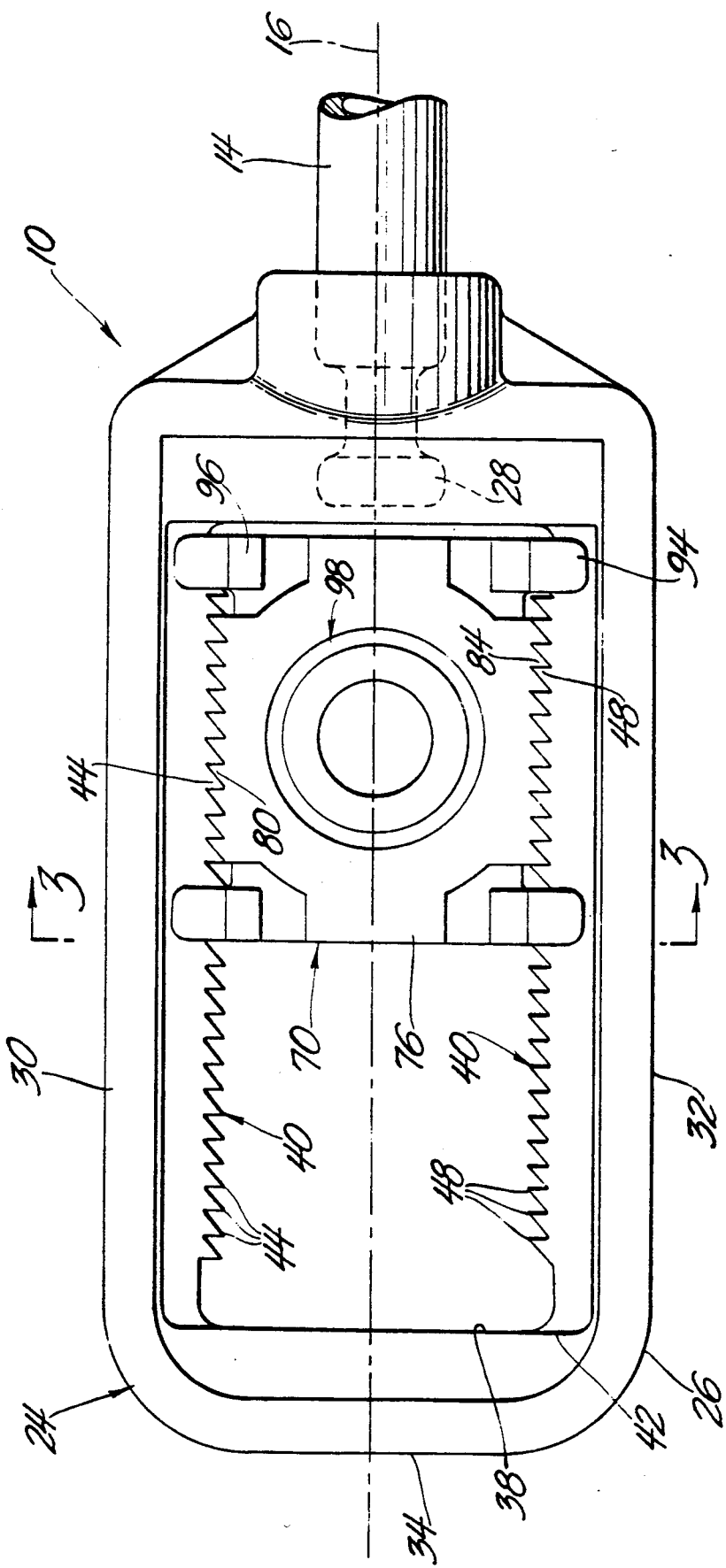
FIG. 8 is a top view of the preferred embodiment of the instant invention in the locked position with the slider member disposed in a fully retracted position.
Figure 9:
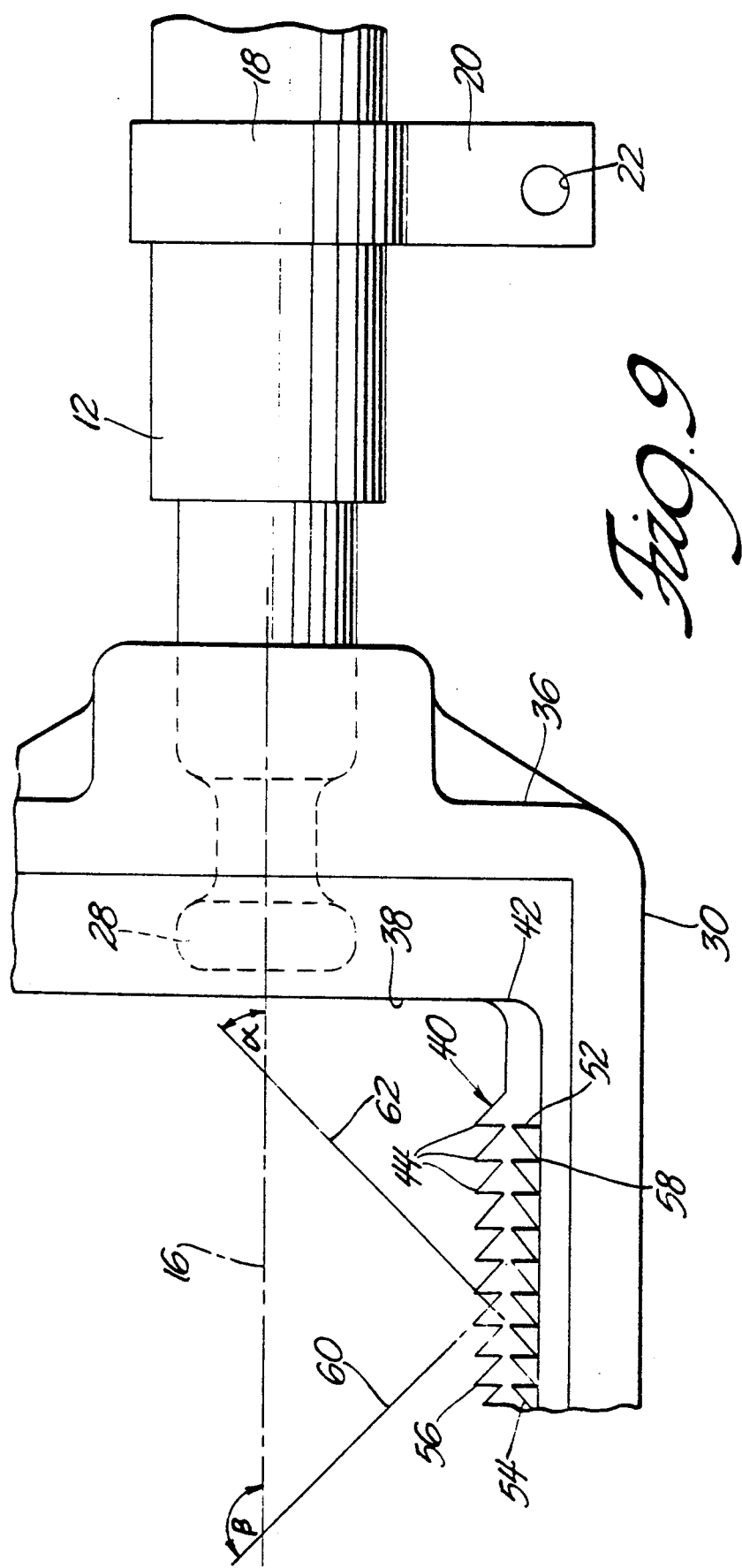
FIG. 9 is a fragmentary enlarged view of a portion of the adjustment body, core element, and conduit.

The receiving teeth 40 are individually inclined longitudinally generally along the central axis 16, as best shown in FIGS. 1, 8 and 9. More specifically, each individual tooth of the receiving teeth 40 includes a vertical surface 52 and a ramping surface 54 which intersect at an apex 56. A root 58 is defined where the ramping surface 54 intersects the vertical surface 52 on the next adjacent tooth.

The ramping surfaces 54 of the upper receiving rows 44,48 are each inclined in a direction away from that of the lower receiving rows 46,50. However, the ramping surfaces 54 of the first 44 and second 48 upper receiving rows, respectively, are inclined in opposite directions. Hence, the first upper receiving row 44 is inclined in the same direction as the second lower receiving row 50, and the first lower receiving row 46 is inclined in the same direction as the second upper receiving row 48.

The first upper receiving row 44 extends from the back end 36, or core end 28, of the adjustment body 26 first with the ramping surface 54, second with the vertical surface 52, to the front end 34 of the adjustment body. A predetermined obtuse angle $\beta$ is therefore formed between an extension 60 of the ramping surface 54 and the central axis 16 measured in a counterclockwise direction from the central axis 16 as shown in FIG. 9. The first lower receiving row 46 extends from the back end 36 first with the vertical surface 52, second with the ramping surface 54 to the front end 34 of the adjustment body. A predetermined acute angle $\alpha$ is therefore formed between an extension 62 of the ramping surface 54 and the central axis 16 measured in a counterclockwise direction from the central axis 16 as shown in FIG. 9. The acute angle α and obtuse angle β are supplemental, with their sums equalling 180°.

The second upper receiving row 48 extends from the back end 36 first with the vertical surface 52, second with the ramping surface 54 to the front end 34 of the adjustment body 26 forming a predetermined acute angle between the central axis 16, equal in measure to the angle α above. The second lower receiving row 50 extends from the back end 36, or core end 28, of the adjustment body 26 first with the ramping surface 54, second with the vertical surface 52, to the front end 34 of the adjustment body forming a predetermined obtuse angle between the central axis 16, equal in measure to the angle β above.

A positioning groove 64 is disposed on the interior surfaces 42 each lateral wall 30,32, between the upper receiving rows 44,48 and lower receiving rows 46,50. Hence, two identical positioning grooves 64 are formed, with one groove 64 each being disposed on the first 30 and second 32 lateral walls, respectively. The positioning groove 64 extends generally parallel to the central axis 16 from the front end 34 to the back end 36 of the adjustment body 26. The first 30 and second 32 lateral walls each include an upper edge 66. A locking groove 68 is disposed between the upper edge 66 and the first 44 and second 48 upper receiving rows. The locking groove 68 extends generally parallel to the positioning groove 64 from the front end 34 to the back end 36 of the adjustment body 26.

The adjustment means 24 further includes a slider member, generally indicated at 70 in FIGS. 1-5, 8. The slider member 70 is generally rectangular in shape and includes a first side wall 72, which, when disposed within the slot 38, extends parallel to the first lateral wall 30, a second side wall 74 extending parallel to the second lateral wall 32 and a pair of end walls 76 extending perpendicularly between and connecting the first 72 and second 74 side walls. A plurality of engaging teeth, generally indicated at 78, are disposed on the first 72 and second 74 side walls for matingly engaging with a portion of the receiving teeth 40 disposed on the adjustment body 26 as shown in FIGS. 4-6.

The engaging teeth 78 disposed on the first side wall 72 are arranged in a first upper engaging row 80 extending longitudinally to the central axis 16 and a first lower engaging row 82 extending longitudinally of the central axis 16. The engaging teeth 78 disposed on the second side wall 74 are arranged in a second upper engaging row 84 extending longitudinally of the central axis 16 and a second lower engaging row 86 extending longitudinally of the central axis 16.

Figure 6:
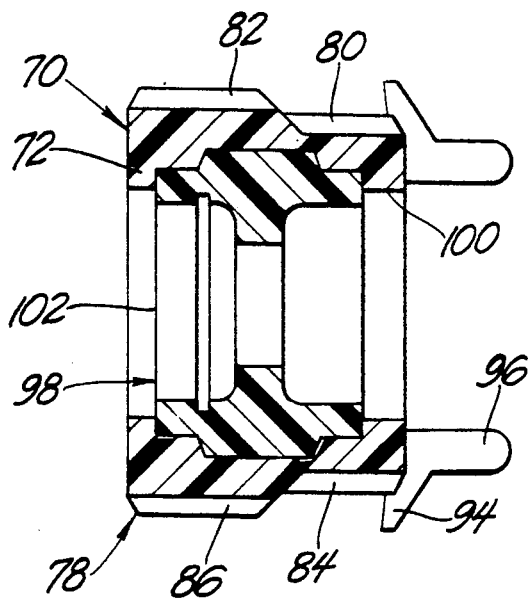
FIG. 6 is a cross-sectional view of the slider member taken substantially along line 6—6 of FIG. 4.

Both the first 84 and second 86 lower engaging rows extend further out from the side walls 72,74 than the first 80 and second 84 upper engaging rows, providing an offset appearance as shown in FIGS. 4, 5 and 6. Therefore, the first 80 and second 84 upper engaging rows and the first 82 and second 86 lower engaging row are disposed laterally offset relative to the central axis 16 and complimentarily to the first 44 and second 48 upper receiving rows and the first 46 and second 50 lower receiving rows.

The engaging teeth 78 are individually inclined longitudinally generally along the central axis 16 and complimentarily to the receiving teeth 40, as shown in FIG. 4. More specifically, each individual tooth of the engaging teeth 78 include a vertical surface 52, ramping surface 54, apex 56, and root 58, as with the receiving teeth 40 above. Therefore, the ramping surfaces 54 of each tooth of the first upper engaging row 80 form an acute angle with the central axis 16, equal in measure to the angle α above. Likewise, the ramping surfaces 54 of each tooth in the second upper engaging row 84 forms an obtuse angle with the central axis 16 equal in measure to the angle β above. Similarly, the ramping surfaces 54 of the first lower engaging row 82 form an obtuse angle with the central axis 16 equal in measure to the angle β, and the ramping surfaces 54 of the second lower engaging row 86 form an acute angle with the central axis 16 equal in measure to the angle α.

Figure 3:
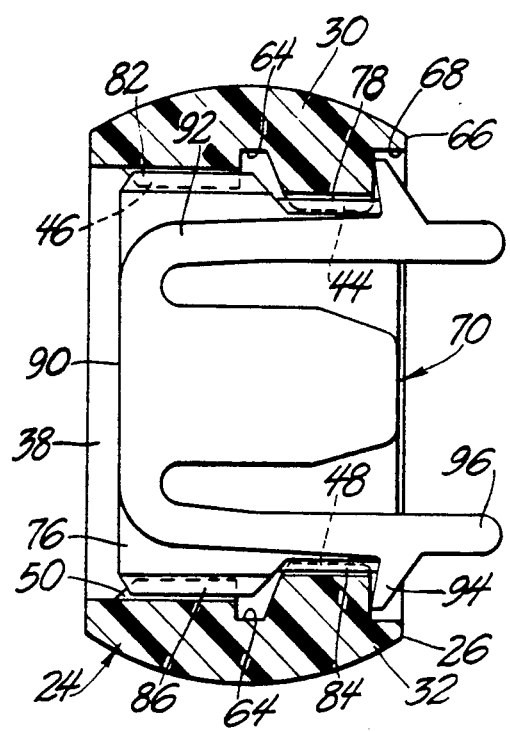
FIG. 3 is a cross-sectional view as in FIG. 2 showing the slider member in a locked position and taken substantially along line 3—3 of FIG. 8.

The slider member 70 includes a pair of tangs 88 disposed on the end walls 76 and extending perpendicularly to the first 72 and second 74 side walls as best shown in FIGS. 2, 3 and 5. Each tang 88 is U-shaped and includes a cross-member 90 and a pair of flexible side arms 92 extending upwardly from the cross member 90. A tang ridge 94 extends outwardly from each of the side arms 92 and is shaped to be slideably disposed in the positioning groove 64. Each side arm 92 extends upwardly beyond the tang ridge 94 defining a release tab 96.

The slider member 70 further includes a terminal receptacle means, generally indicated at 98 in FIGS. 6 and 10, for receiving the control member. The terminal receptacle means 98 includes a cylindrical hole 100 which extends transversely to the central axis 16 through the slider member 70. A connector bushing 102 is disposed in the cylindrical hole 100.

In operation, the slider member 70 is slidably disposed in the slot 38 in an unlocked position and is moveable in either of two longitudinal directions parallel to the core central axis 16 to adjust the length of the core element 14. The tang ridges 94 are disposed in the positioning groove 64 such that the receiving teeth 40 and the engaging teeth 78 are not engaged thereby permitting relative axial movement between the adjustment body 26 and the slider member 70. In the unlocked position the upper engaging rows 80,84 are disposed adjacent to, but not engaging, the lower receiving rows 46,50. The first and second lower rows of engaging teeth 82,86 extend below the adjustment body 26 in the unlocked position. The offset of these rows allows free longitudinal movement of the slider member 70 within the slot 38 of the adjustment body 26.

Once the slider member 70 is adjusted to the proper position within the slot 38, the slider member 70 is moved further into the slot 38 in an inward direction transverse to the central axis 16 of the core element 14 to a locked position such that the tang ridges 94 are disposed in the locking groove 68 thereby allowing the meshing engagement of the receiving teeth 40 with the engaging teeth 78 to prevent relative axial movement between the adjustment body 26 and the slider member 70. In the locked position the teeth of the upper engaging rows 80,84 engage the teeth of the upper receiving rows 44,48 and the teeth of the lower engaging rows 82,86 engage the teeth to the receiving rows 46,50 thereby preventing relative axial movement between the slider member 70 and the adjustment body 26.

Once in the locked position, the slider member 70 can be returned to the unlocked position by manually urging the tang ridges 94 to disengage from the locking groove 68 and move transversely in the slot 38 outwardly to the positioning groove 64 thereby disengaging the receiving teeth 40 from the engaging teeth 78 to permit relative axial movement between the adjustment body 26 and the slider member 70. The flexible tangs 88 permit deflection of the tang side arms 92 such that the tang ridges 94 can slide over the upper receiving rows 44,48. The release tabs 96 permits the flexing of the tang side arms 92 for manual disengagement of each of the tang ridges 94 from the respective locking grooves 68.

The terminal receptacle means 98 disposed on the slider member 70 couples with the control member in a direction parallel to the inward and outward direction of the slider member 70, as best shown in FIG. 10. The portion of the control member received into the cylindrical hole 100 is therefore in coupling attachment transverse, or normal, to the central axis 16. This orientation permits the control member to remain attached to the slider member 70 while the slider member 70 moves from the locked to the unlocked position, is repositioned axially in the unlocked position, and then moves to the locked position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) comprising:
   a conduit (12);
   a flexible motion transmitting core element (14) having a length and a central axis (16) and movably supported along said length within said conduit (12);
   an adjustment body (26) fixedly secured to said core element (14) and including a pair of opposite first and second lateral walls (30,32) with an interior surface (42) and a slot (38) extending therebetween parallel to said central axis (16);
   a slider member (70) slidably disposed in said slot (38) along two longitudinal directions parallel to said core central axis (16) relative to said core element (14) to adjust said length of said core element (14);
   said slider member (70) having a plurality of transverse engaging teeth (78) and moveable in an inward direction transversely of said central axis (16) to a locked position and moveable in an outward direction opposite to said inward direction to an unlocked position permitting relative axial movement between said adjustment body (26) and said slider member (70);
   a plurality of receiving teeth (40) disposed in opposing rows on said opposite first and second lateral walls (30,32) said interior surface (42) of said slot (38) and opposite said engaging teeth (78) for intermeshing with said engaging teeth (78) to prevent relative axial movement between adjustment body (26) and said slider member (70) in said locked position;
   terminal receptacle means (98) disposed on said slider member (70) for coupling attachment in a direction parallel to said inward and outward direction while maintaining said engaging teeth (78) in said unlocked position and permitting relative movement between said slider member (70) and said adjustment body (26) while a control member is in coupling attachment to said slider member (70).

2. An assembly (10) as set forth in claim 1 and including
   said opposing rows of receiving teeth (40) disposed on said first lateral wall (30) arranged in a first upper receiving row (44) extending longitudinally of said central axis (16) and a first lower receiving row (46) extending longitudinally of said central axis (16) and
   said opposing rows of receiving teeth (40) disposed on said second lateral wall (32) arranged in a second upper receiving row (48) extending longitudinally of said central axis (16) and a second lower receiving row (50) extending longitudinally of said central axis (16).

3. An assembly (10) as set forth in claim 2 and including
   said first and second upper receiving rows (44,48) being disposed laterally offset relative to said central axis (16) from said first and second lower receiving rows (46,50).

4. An assembly (10) as set forth in claim 3 and including
   said individual receiving teeth (40) of said first and second upper receiving rows (44,48) being inclined longitudinally of said central axis (16) and
   said individual receiving teeth (40) of said first and second lower receiving rows (46,50) being inclined longitudinally of said central axis (16).

5. An assembly (10) as set forth in claim 4 and including
   said individual receiving teeth (40) of said first and second upper receiving rows (44,48) being inclined in a direction away from said individual receiving teeth (40) of said first and second lower receiving rows (46,50).

6. An assembly (10) as set forth in claim 5 and including
   said individual receiving teeth (40) of said first upper receiving row (44) being inclined at a predetermined obtuse angle ($\beta$) and said individual receiving teeth (40) of said second upper receiving row (48) being inclined at a supplemental acute angle ($\alpha$) and
   said individual receiving teeth (40) of said first lower receiving row (46) being inclined at said acute angle ($\alpha$) and said individual receiving teeth (40) of said second lower receiving row (50) being inclined at said obtuse angle ($\beta$).

7. An assembly (10) as set forth in claim 6 and including
   a positioning groove (64) disposed on each of said first lateral wall (30) and said second lateral wall (32) between said first and second upper receiving rows (44,48) and said first and second lower receiving rows (46,50).

8. An assembly (10) as set forth in claim 7 and including
   an upper edge (66) on each of said first lateral wall (30) and said second lateral wall (32),
   a locking groove (68) disposed between said upper edge (66) and said first and second upper receiving rows (44,48).

9. An assembly (10) as set forth in claim 9 by said slider member (70) including a first side wall (72) extending parallel to said first lateral wall (30) and a second side wall (74) extending parallel to said second lateral wall (32).

10. An assembly (10) as set forth in claim 9 said terminal receptacle means (98) including
   a connector bushing (102) for receiving the control member.

11. An assembly (10) as set forth in claim 10 further characterized by
   a cylindrical hole (100) extending therethrough transversely to said central axis (16) for receiving said connector bushing (102).

12. An assembly (10) as set forth in claim 8 and including
   said plurality of engaging teeth (78) disposed on each of said first side wall (72) and second side wall (74) for matingly engaging with at least some of said receiving teeth (40) disposed on said adjustment body (26) and
   said plurality of engaging teeth (78) disposed on said first side wall (72) arranged in a first upper engaging row (80) extending longitudinally of said central axis (16) and a second lower engaging row (82) extending longitudinally of said central axis (16) and
   said plurality of engaging teeth (78) disposed on said second side wall (74) arranged in a second upper engaging row (84) extending longitudinally of said central axis (16) and a second lower engaging row (86) extending longitudinally of said central axis (16)
   said upper (80,84) and lower (82,86) engaging rows being disposed in opposing relationship to one another.

13. An assembly (10) as set forth in claim 12 and including
   said first and second upper (80,84) and said first and second lower (82,86) rows of engaging teeth being disposed laterally offset relative to said central axis (16) complimentarily to said first and second upper (44,48) and said first and second lower (46,50) receiving rows of receiving teeth.

14. An assembly (10) as set forth in claim 13 and including
   said individual engaging teeth 78 of said first and second upper rows of engaging teeth (80,84) being inclined in one direction longitudinally of said central axis (16) and
   said individual engaging teeth (78) of said first and second lower rows of engaging teeth (82,86) being inclined in one direction longitudinally of said central axis (16).

15. An assembly (10) as set forth in claim 14 and including
   said individual engaging teeth (78 of said first and second upper engaging row (80,84) being inclined in a direction away from said individual engaging teeth (78) of said first and second lower engaging row (82,86).

16. An assembly (10) as set forth in claim 15 and including
   said individual engaging teeth (78) of said first upper engaging row (80) being inclined at said acute angle ($\alpha$), and
   said individual engaging teeth (78) of said second upper engaging row (84) being inclined at said obtuse angle ($\beta$), and
   said individual engaging teeth (78) of said first lower engaging row (82) being inclined at said obtuse angle ($\beta$), and said individual engaging teeth (78) of said second lower engaging row (86) being inclined at said acute angle ($\alpha$).

17. An assembly (10) as set forth in claim 16 and including
   a pair of tangs (88) disposed perpendicularly therebetween said side walls (72,74).

18. An assembly (10) as set forth in claim 16 and including
   a tang ridge (94) extending outwardly from said tangs (88) and disposed to slide in said positioning groove (64).

19. An assembly (10) as set forth in claim 18 further characterized by
   said tangs (88) being flexible such that said tang ridges (94) are manually urged to disengage from said positioning groove (64) and move transversely to said locking groove (68) such that said slider member (70) transversely moves relatively to said central axis between said unlocked position and said locked position.

20. An assembly (10) as set forth in claim 19 said tangs (88) including
   a release tab (96) for manual disengagement of each of said tang ridge (94) from said locking groove (68).

* * * * *